United States Patent
Gras

[19]

[11] Patent Number: 5,832,809
[45] Date of Patent: Nov. 10, 1998

[54] MICROWAVE OPERATED COFFEE MAKER

[76] Inventor: Marlene Gras, P.O. Box 831390, Miami, Fla. 33183

[21] Appl. No.: 569,066

[22] Filed: Nov. 9, 1995

[51] Int. Cl.[6] .............................. A47J 31/00; H05B 6/82
[52] U.S. Cl. ............................. 99/299; 99/306; 219/689
[58] Field of Search ............................ 99/279, 299, 306, 99/304, 305, 300, 280, 281, 282, 283; 219/689; 426/241, 433

[56] References Cited

U.S. PATENT DOCUMENTS 4,381,696  5/1983  Koral ........................................ 99/304
4,386,109  5/1983  Bowen et al. .......................... 219/689
5,049,713  9/1991  Creyaufmuller ....................... 219/689
5,249,509  10/1993  English .................................... 99/299
5,281,785  1/1994  Pasbrig ................................... 99/306

*Primary Examiner*—Robert W. Jenkins

[57] ABSTRACT

A coffee maker to be used in conjunction with a field of microwave radiation. An upper tubular reservoir is removably mounted to a lower tubular reservoir through the use of a connecting member that holds a valve assembly centrally therein. A coffee filter basket assembly is mounted within lower tubular reservoir below the valve assembly. A cap with an opening prevents spillage of hot water and the build up of pressure in the upper tubular reservoir member.

5 Claims, 2 Drawing Sheets

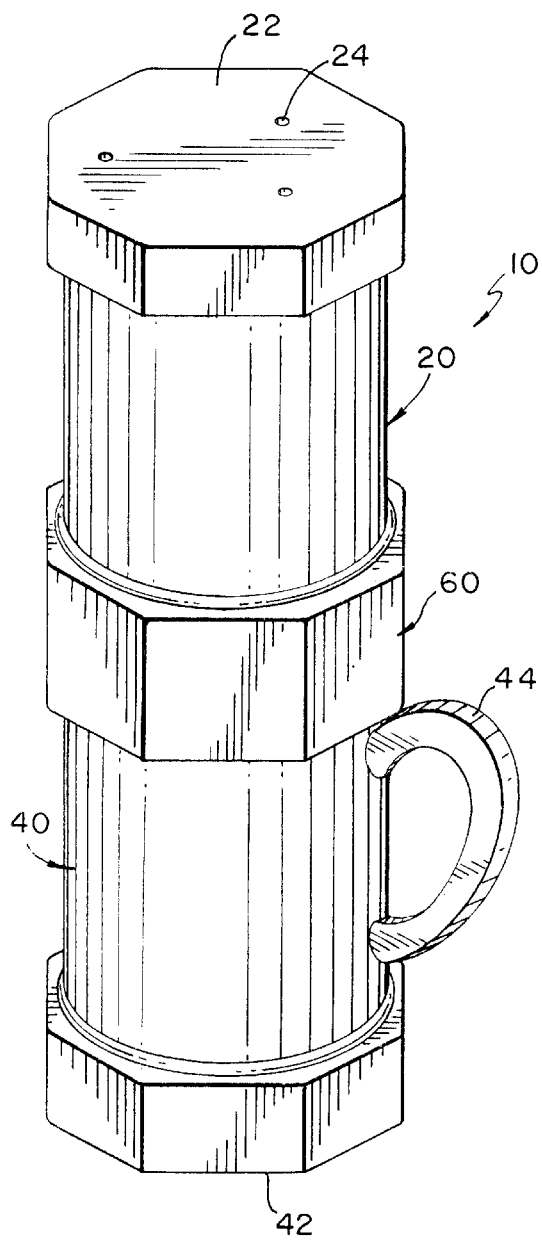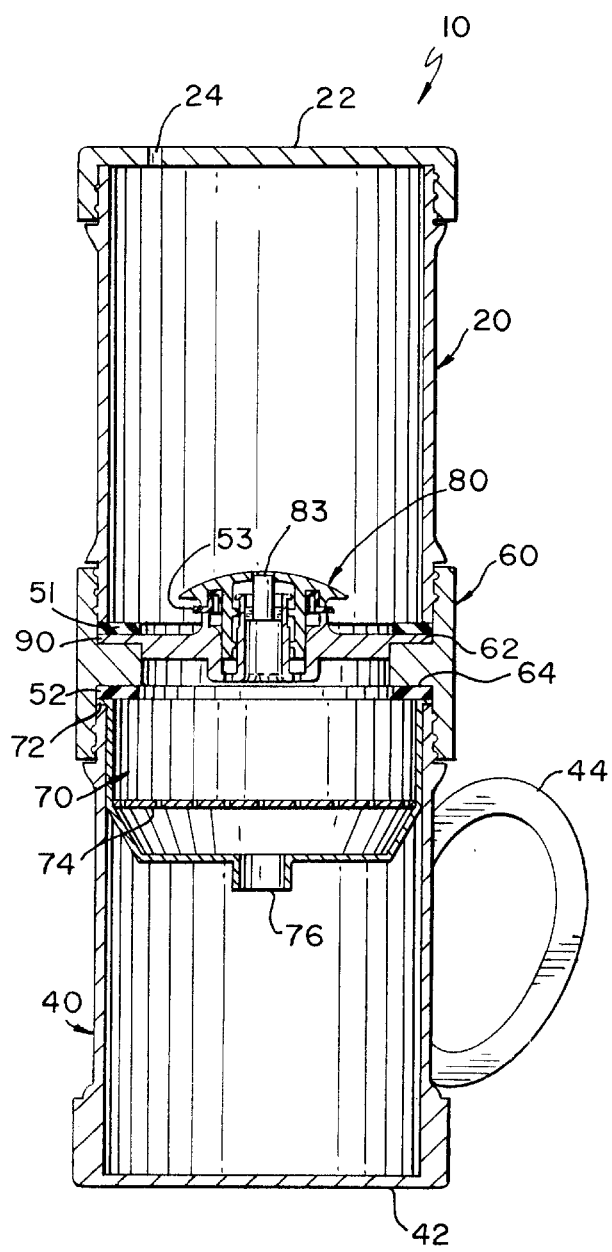

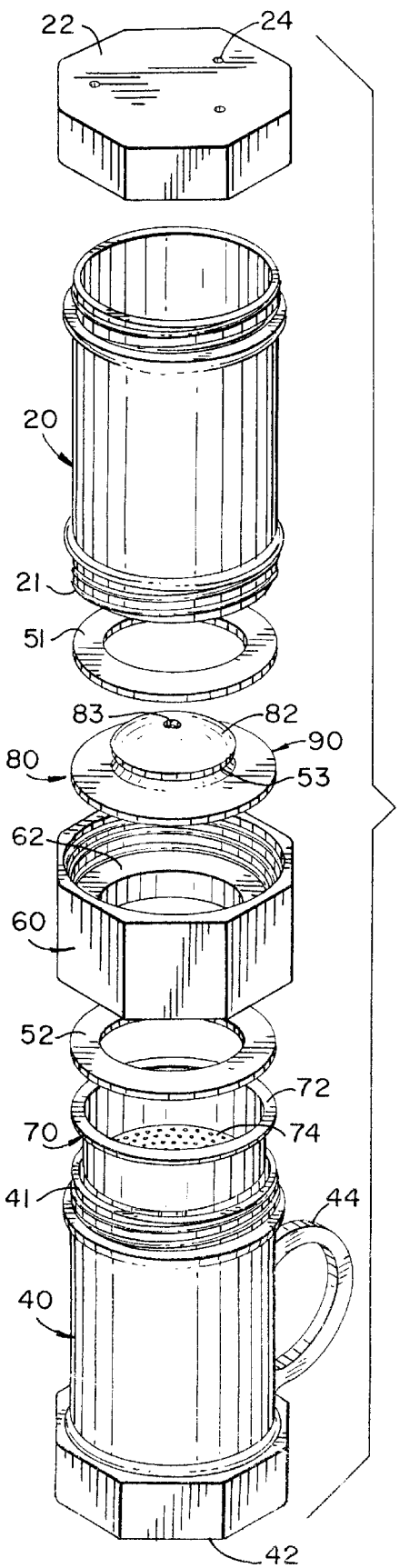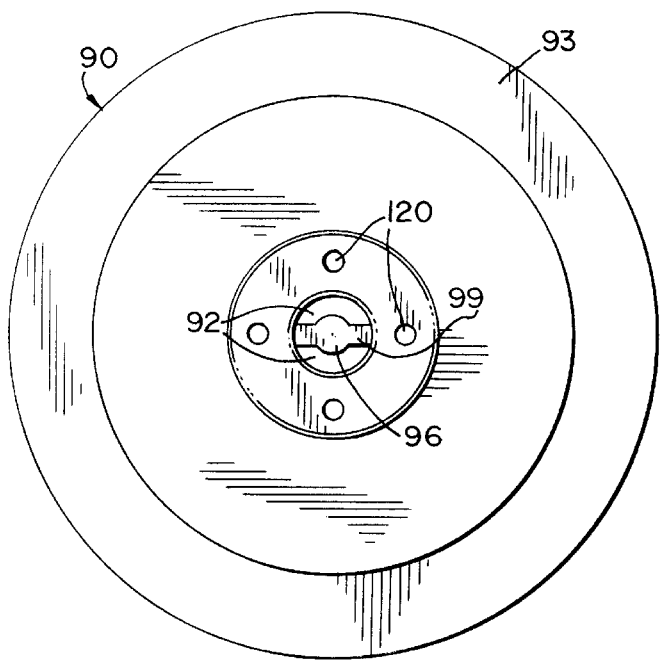
FIG. 3.
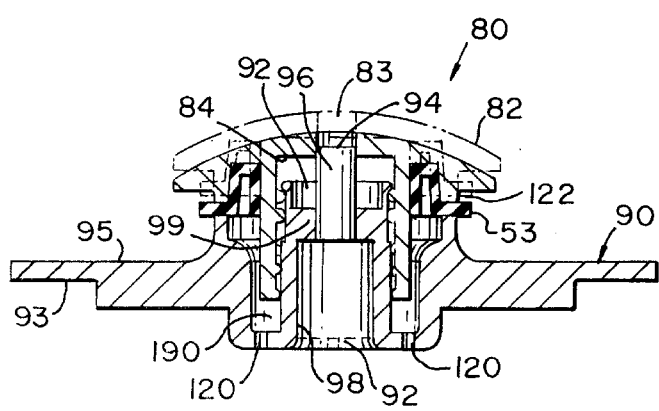
FIG. 4.
FIG. 5.

MICROWAVE OPERATED COFFEE MAKER

BACKGROUND OF THE INVENTION

1. Field of the Invention

The present invention relates to a valve for a coffee maker, and more particularly, to the type that operates with microwave energy.

2. Description of the Related Art

There are many coffee makers operated with microwave energy, but none of them discloses the features of the present invention. Applicant believes that the closest reference corresponds to U.S. Pat. No. 4,381,696 issued to Koral in 1983 for a microwave coffee making apparatus. However, it differs from the present invention because Koral's patent teaches a manually operated valve which during the making operation is partially open and includes several apertures through where water is continuously draining onto a coffee ground basket without being heated enough. The present invention discloses a valve that overcomes this disadvantage. The valve in the present invention opens when the air is heated and the pressure is increased and the air pushed up through a centrally disposed passage. Immediately subsequently, this passage allows the heated water to drain through the valve. The present invention ensures that the water does not come in contact with the coffee until it has reached a predetermined temperature. The temperature reached will depend on the magnitude of the pressure that is required to overcome the valve in the closed position to open it. The tighter the valve elements are, the higher the pressure that is required and the longer the time that the air and the water in the coffee maker are exposed to the microwave radiation.

Once the valve opens, it is not necessary for the microwave radiations to continue and the coffee can be brewed by the water passing through the coffee. This is an advantage because it prevents the burning of the coffee taste.

SUMMARY OF THE INVENTION

It is one of the main objects of the present invention to provide a coffee maker that can be used for rapidly brewing coffee, including expresso style coffee, using microwave radiations.

It is another object of this invention to provide a coffee maker that is portable and easy to assemble.

It is still another object of the present invention to provide a coffee maker that has a valve assembly that permits a user to automatically brew coffee beverage within a short period of time by causing the hot water to pass through the ground coffee without overheating the resulting brew.

It is yet another object of this invention to provide such a device that is simple and inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric view of a coffee maker.

FIG. 2 is an elevational cross sectional view of the embodiment shown in FIG. 1.

FIG. 3 illustrates an exploted view of the embodiment previously shown.

FIG. 4 is an elevational cross sectional view of a valve assembly used in the coffee maker subject of the present application.

FIG. 5 is a bottom view of the valve assembly used in the present invention.

DETAILED DESCRIPTION OF THE PREFERRED EMBODIMENT

Referring now to the drawings, where the present invention is generally referred to with numeral 10, it can be observed that it basically includes upper tubular reservoir 20 removably mounted to lower tubular reservoir 40 with connecting member 60, coffee filtering basket 70 and valve assembly 80.

Coffee maker 10, as shown in FIG. 3, includes several parts disposed in coaxial alignment with respect to each other. Valve assembly 80 includes valve member 82 that is slidably and snugly mounted within central opening 190 of plate assembly 90. Assembly 90 includes plug member 96 that is perpendicularly mounted thereon. Uppermost end 94 opens opening 83 of valve member 82 when the latter travels away from plate assembly 90. When valve member 82 is pushed towards plate assembly 90, then uppermost end 94 closes opening 83. When closed, the interaction of uppermost end 94 and opening 83 does not permit any liquid or gas to pass through. Plug member 96 is held in place by bridge member 99. As illustrated in FIGS. 4 and 5, bridge member 99 keeps plug member 96 centrally disposed within valve assembly 80 leaving passage 92 for the air and water to pass through. Valve assembly 80 rests on shoulder 62 of connecting member 60. Outer flange 93 of plate assembly 90, as best seen in FIG. 3, rests on shoulder 62. Seal 51 is designed to achieve substantial hermeticism when sandwiched between upper surface 95 of plate assembly 90 and the lower edge 21 of upper tubular reservoir 20. In this manner, tubular reservoir 20 is screwed in within connecting member 60 and valve assembly 80 is sandwiched between seal 51 and shoulder 62 of connecting member 60.

Seal 53, like above mentioned seal 51, also achieves hermeticism between plug member 82 and plate assembly 90 when the former is pressed against the latter and end 94 is blocking opening 83 from air and water flow.

Coffee filtering basket 70 is removably mounted within lower tubular reservoir 40 and held in place by upper flange 72 that rests over the upper edge 41 of lower tubular reservoir 40. Coffee filtering basket assembly 70, as shown in FIGS. 2 and 3, comprises filter member 74 and outlet 76 and is designed for holding the coffee ground. Once basket assembly 70 is mounted within reservoir 40, seal 52 is placed above upper flange 72 and trapped by lower shoulder 64 of connecting member 60, as shown in FIG. 2.

Upper tubular reservoir 20 is filled with water and covered with cap member 22. Openings 24 in cap member 22 prevents the air pressure to build up within upper tubular reservoir 20. To use coffee maker 10, it is exposed to microwaves radiations, typically by using a conventional microwave oven. The air inside lower tubular reservoir 40 is heated and plug member 82 is pushed up after a sufficient pressure is built up and the necessary force is applied against inner wall 84. When this force overcomes the resistance of valve member 82 snugly mounted to tubular member 98, opening 83 coacts as valve seat for plug member 96 and is cleared permitting the heated air out and letting the hot water down after the air exits, as best seen in FIG. 4. Once valve member 82 is pushed upwardly, elongated tubular member 96 unplugs the exit and opening 83 is free for air to pass through and for heated water to run downwardly into reservoir 40. After the heated water passes passage 92 of valve assembly 80, pass through coffee filtering basket assembly 70 containing coffee ground and the brewed coffee is received into reservoir 40. Once all the water is made coffee beverage, a user unscrews connecting member 60 and reservoir 40 is ready to be used as a drinking cup with bottom surface 42. As user can hold reservoir 40 by handle 44. Relief openings 120 permit the heated air inside lower tubular reservoir 40 to exit. The heated air proceeds upwardly through passage 190 and out through port 122 when valve member 82 is lifted.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A coffee maker to be used in conjunction with a field of microwave radiation, comprising:
    A) upper tubular housing means having first and second ends, and said housing means being at least partially filled with water;
    B) lower tubular housing means having third and fourth ends wherein said fourth end includes a bottom surface and said third end is removably mounted to said second end;
    C) filter means for holding ground coffee mounted within said lower tubular housing means; and
    D) valve means mounted above said filter means and connected to said upper and lower housing means, and said valve means further including a valve member that opens in response to the application of a predetermined amount of force caused by the air pressure built by the exposure of said lower tubular housing means to said microwave radiations that raise the temperature of the air inside said lower tubular housing means.

2. The coffee maker set forth in claim 1 further including:
    E) cap means for closing said first end.

3. The coffee maker set forth in claim 2 further including:
    F) means for connecting said upper and lower tubular housing means including fifth and sixth ends, and said connecting means having an inwardly extending shoulder supporting said valve means, and said fifth end being removably connected to said second end and said sixth end being removably connected to said third end.

4. The coffee maker set forth in claim 3 wherein said valve means includes a plate assembly that has a perpendicularly extending tubular member mounted thereon and over which said valve member is snugly mounted, said tubular member includes a centrally disposed plug member and said valve member includes an opening that cooperatively coacts as a valve seat for said plug member.

5. The coffee maker set forth in claim 4 wherein said cap member includes an opening to prevent air pressure from building up.

* * * * *